(12) United States Patent
Marly

(10) Patent No.: US 9,260,179 B2
(45) Date of Patent: Feb. 16, 2016

(54) PROPELLER AND SYSTEM OF COUNTER-ROTATING PROPELLERS COMPRISING IMPROVED MEANS FOR LIMITING PITCH, AND A TURBINE ENGINE COMPRISING THEM

(75) Inventor: Pascal Marly, Melun (FR)

(73) Assignee: SNECMA, Paris (FR)

( * ) Notice: Subject to any disclaimer, the term of this patent is extended or adjusted under 35 U.S.C. 154(b) by 1095 days.

(21) Appl. No.: 13/235,419

(22) Filed: Sep. 18, 2011

(65) Prior Publication Data
US 2012/0070291 A1    Mar. 22, 2012

(30) Foreign Application Priority Data

Sep. 20, 2010 (FR) ...................................... 10 57504

(51) Int. Cl.
*B64C 11/38*     (2006.01)
*B64D 27/02*     (2006.01)

(52) U.S. Cl.
CPC ......... *B64C 11/385* (2013.01); *B64D 2027/026* (2013.01); *Y02T 50/66* (2013.01)

(58) Field of Classification Search
CPC ...... B64C 11/30; B64C 11/38; B64C 11/385; F01D 7/00
USPC ............... 416/26, 27, 46, 157 A, 157 R, 147; 92/24, 26, 27, 28
See application file for complete search history.

(56) References Cited

U.S. PATENT DOCUMENTS

| 4,061,440 | A | * | 12/1977 | Belliere | .................... 416/157 R |
| 4,863,347 | A | | 9/1989 | Trott et al. | |
| 5,226,346 | A | | 7/1993 | Wagner et al. | |
| 5,242,265 | A | * | 9/1993 | Hora et al. | ....................... 416/26 |
| 2010/0135799 | A1 | | 6/2010 | Morgan | |

FOREIGN PATENT DOCUMENTS

EP        2 192 307 A2     6/2010

OTHER PUBLICATIONS

French Search Report issued May 20, 2011, in Patent Application FR 1057504 (With English Translation of Category of Cited Documents).

* cited by examiner

*Primary Examiner* — Edward Look
*Assistant Examiner* — Maxime Adjagbe
(74) *Attorney, Agent, or Firm* — Oblon, McClelland, Maier & Neustadt, L.L.P.

(57) ABSTRACT

A propeller for an aircraft turbine engine, comprising means for adjusting the pitch of the blades comprising a hydraulic actuator borne by the rotor and including a cavity and a piston displaceable in said cavity and dividing said cavity into two chambers, as well as means for limiting the stroke of the piston in order to prevent displacement of said blades in a predetermined direction beyond a predetermined limiting pitch angle, and comprising hydraulic connection means with which both chambers may be put into communication with each other as soon as the pitch angle of the blades becomes equal to said predetermined limiting pitch angle during the displacement of said blades in said predetermined direction, these hydraulic connection means being borne by said rotor of the propeller.

14 Claims, 1 Drawing Sheet

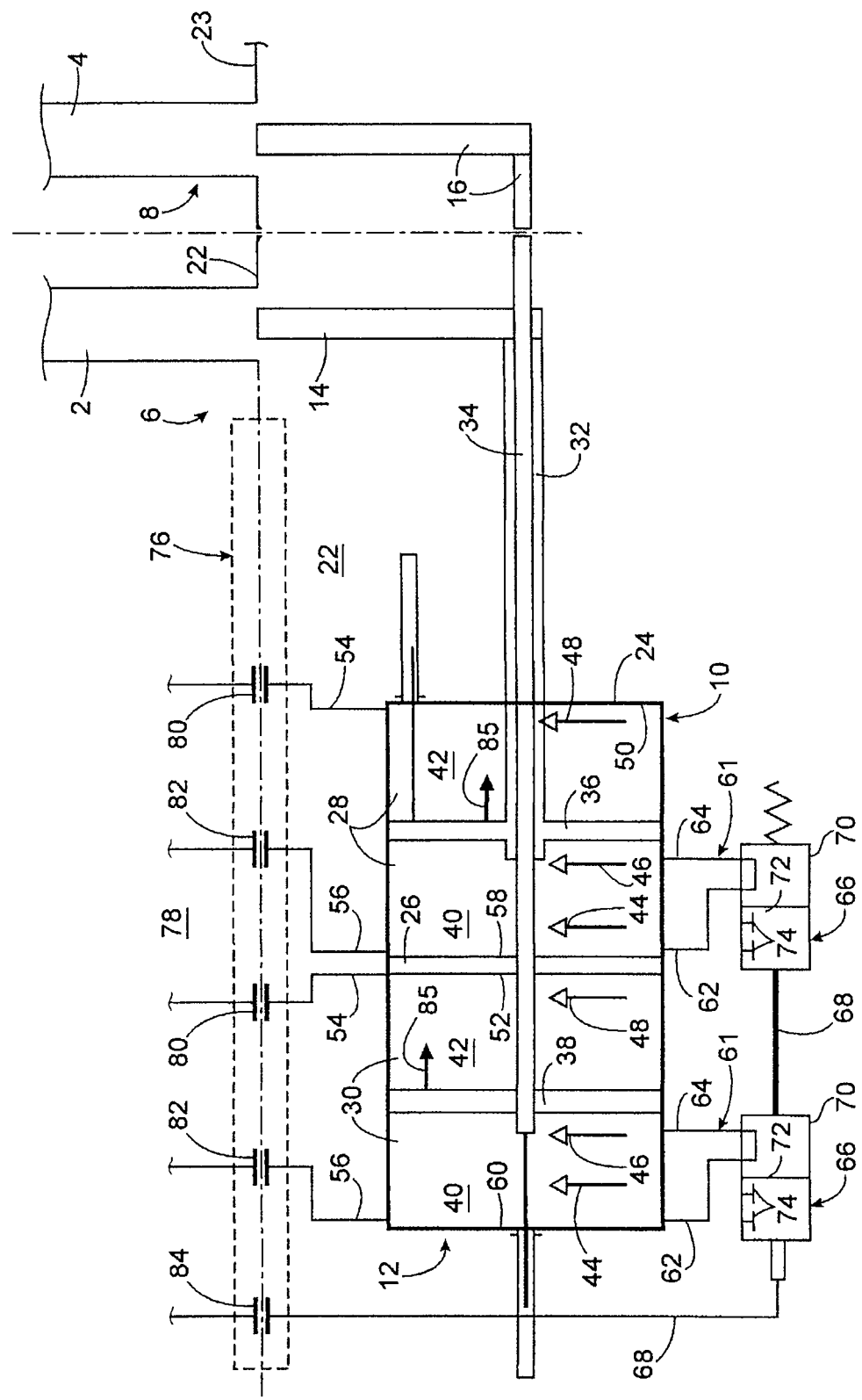

PROPELLER AND SYSTEM OF COUNTER-ROTATING PROPELLERS COMPRISING IMPROVED MEANS FOR LIMITING PITCH, AND A TURBINE ENGINE COMPRISING THEM

TECHNICAL FIELD

The present invention relates to the field of aircraft turbine engines and more particularly to the adjustment of the pitch of the blades of one or more propellers in an aircraft turbine engine, such as an airplane turbo-prop or turbojet engine.

The invention may notably be applied to turbine engines equipped with a system of counter-rotating propellers and in particular to so called "open rotor" turbine engines, the propellers of which are without any fairing at their external radial ends.

STATE OF THE PRIOR ART

It is well known how to equip propellers of aircraft turbine engines with means for adjusting the pitch of the blades of these propellers in order to adapt said pitch to the different flight conditions of aircrafts. These adjustment means may further allow feathering of the propellers or further a negative pitch allowing these propellers to operate in a thrust-inversion also called reverse mode.

The aforementioned adjustment means usually comprise one or more hydraulic actuators as well as means for converting the movement of each actuator into an adequate displacement of the blades.

However, involuntary adjustment of the blades of a propeller on a position of small pitches or thrust-inversion, corresponding to a low or negative pitch angle, may cause serious problems when it occurs in certain flight phases. Now, such an involuntary adjustment may result from a pilot error but also from a failure of the members for controlling the pitch pitch of the blades of the propellers.

This is why propellers equipped with variable pitch blades are usually provided with safety devices aiming at preventing any undesirable adjustment of the pitch of the blades of the propellers below a predetermined minimum pitch angle which is generally of the order of about 30 degrees.

These safety devices generally include means for limiting the travel of the hydraulic actuators intended to adjust the pitch of the blades in order to prevent displacement of the rod of these actuators beyond a position corresponding to said predetermined minimum pitch angle.

The means for limiting the travel of the rod of hydraulic actuators known from the prior art comprise retractable abutments, or devices actuated by the rod of the actuators in order to modify the hydraulic circuit for controlling the actuators when their rod attains the position corresponding to said predetermined minimum pitch angle.

However, because of their mechanical nature, these means have limited reliability, notably liable to induce maintenance overcosts.

This is in particular a penalty in the case of systems of counter-rotating propellers, which include two propellers and therefore two safety devices of the type described above.

DISCUSSION OF THE INVENTION

The object of the invention is notably to provide a simple, economical and efficient solution to these problems with which the aforementioned drawbacks may be at least partly avoided.

For this purpose, the invention proposes a propeller for an aircraft turbine engine, comprising a propeller rotor, blades borne by said rotor, and adjustment means for adjusting the pitch of said blades, said adjustment means comprising at least one double acting hydraulic actuator borne by a said rotor and including at least one cavity and a corresponding piston housed and displaceable in said cavity for causing modification of the pitch angle of said blades, said piston dividing said cavity into two chambers, said adjustment means further comprising limitation means for limiting the stroke of each piston of each aforementioned actuator for preventing displacement of said blades into a predetermined direction, corresponding to a displacement of the piston in a direction orientated from a second chamber towards a first chamber of the cavity housing said piston, beyond a predetermined limiting pitch angle.

According to the invention, said limitation means comprise hydraulic connection means allowing both chambers of each cavity of each aforementioned actuator to be put into fluidic communication with each other as soon as the pitch angle of said blades becomes equal to said predetermined limiting pitch angle during a displacement of said blades into said predetermined direction, said hydraulic connection means being borne by said rotor of the propeller.

By having both chambers defined on either side of each piston of each actuator communicate, it is possible to ensure fluid pressure equality in both of these chambers and thereby interrupt any displacement of the piston tending to move the blades in said predetermined direction beyond said predetermined limiting pitch angle.

Said limitation means proposed by the invention do not require any mechanical interaction with means controlling each actuator, and therefore allow an increase in the reliability of each actuator and a reduction in the maintenance costs.

Further, the interaction between said limitation means and each corresponding actuator does not require any transmission through the interface between the rotor of the propeller and the stator of the latter, only the control of these limitation means being dependant on transmission through this interface. This may have an additional advantage as this will become more clearly apparent in the following.

The propeller preferably includes return means permanently applying to each aforementioned actuator, a return force of opposite direction to said predetermined direction.

These return means thereby allow each piston of each actuator to be moved in a direction opposite to said predetermined direction when such a displacement is desired and when the fluid pressure in the second chamber is maintained at a sufficiently low level.

The aforementioned return means may for example assume the form of a counter-weight connected to the blades of the propeller.

Said adjustment means for adjusting the pitch of the blades of the propeller advantageously comprise a single hydraulic cylinder intended to actuate a rotary mechanism for driving the whole of these blades.

Alternatively, said adjustment means may comprise a set of actuators each comprising one or more rotary pistons and each intended to drive a corresponding blade of the propeller.

Said limitation means for limiting the stroke of each piston of each actuator are advantageously configured in order to prevent displacement of said blades of the propeller towards the small pitch angles beyond said predetermined limiting pitch angle.

These limitation means may thus give the possibility of preventing an adjustment of the pitch of the blades on a position of small pitch angles or thrust inversion when such an adjustment would be a risk for the safety of the aircraft equipped with the aforementioned propeller.

Moreover, said limitation means advantageously include means for enabling and disabling said hydraulic connection means.

This makes an adjustment of the pitch of the blades of the propeller possible beyond the predetermined limiting pitch angle, in said predetermined direction, when such an adjustment is desirable.

Thus, in the case when the limitation means for each piston of each actuator are configured so as to prevent a displacement of the blades of the propeller towards the small pitch angles, said limitation means may then be disabled when the aircraft is on the ground. Setting the blades on a small pitch angle may actually be desirable on the ground. A setting in a thrust inversion position may also be required during braking on the ground upon landing.

The aforementioned hydraulic connection means preferably comprise a hydraulic circuit including:
a first portion connected to a region of each cavity of each actuator which is part of said first chamber of the cavity when said blades of the propeller have a pitch angle equal to said predetermined limiting pitch angle,
a second portion connected to a region of each cavity of each actuator which, during a displacement of said blades in said predetermined direction, passes from said first chamber to said second chamber of the cavity as soon as the pitch angle of said blade becomes equal to said predetermined limiting pitch angle, as well as
a valve connecting said first and second portions of the hydraulic circuit for opening or closing on command said circuit.

When the hydraulic circuit is closed, this circuit allows both chambers defined on either side of each piston of each actuator to communicate with each other as soon as this piston, which moves in a direction such that the blades move in said predetermined direction, attains a position corresponding to said predetermined limiting pitch angle, this communication then making the control of each actuator inoperative. On the other hand, when the hydraulic circuit is open, the latter has no effect on the control of each actuator.

The valve of the hydraulic circuit forms a particular example of a means for enabling and disabling the aforementioned hydraulic connection means.

This valve is preferably of a hydraulically controlled type, but other types of valves may be used without departing from the scope of the present invention.

In a general way, said adjustment means for adjusting the setting of the blades of the propeller preferably comprise a single hydraulic cylinder, in which case said first chamber corresponds to the head chamber of this cylinder while the second chamber corresponds to the rod chamber of the actuator.

The invention also relates to a system of counter-rotating propellers for an aircraft turbine engine, comprising a first propeller, of the type described above, the rotor of which is intended to rotate in a first direction of rotation around a common longitudinal axis of the system of propellers relatively to a stator of the system, as well as a second propeller comprising a rotor intended to rotate in a second direction of rotation, opposite to the first, around the longitudinal axis, with respect to said stator, and blades borne by the rotor of said second propeller.

The system of counter-rotating propellers further comprises adjustment means for adjusting the pitch of the blades of said second propeller, said adjustment means including at least one double acting hydraulic actuator borne by said rotor of said first propeller and comprising at least one cavity and a corresponding piston housed and displaceable in said cavity for causing modification of the pitch angle of said blades of said second propeller, said piston dividing said cavity into two chambers.

Said adjustment means for adjusting the pitch of the blades of said second propeller further comprise limitation means for limiting the stroke of each piston of each actuator intended for adjusting the pitch of the blades of said second propeller in order to prevent a displacement of said blades in a predetermined direction, corresponding to a displacement of the piston in a direction orientated from a second toward a first of said two chambers, beyond a predetermined limiting pitch angle, said means comprising hydraulic connection means borne by the rotor of said first propeller and allowing both chambers of each cavity of each aforementioned actuator to be put in fluidic communication with each other as soon as the pitch angle of said blades becomes equal to said predetermined limiting pitch angle, during a displacement of said blades in said predetermined direction.

It should be noted that the whole of the hydraulic actuators intended for the adjustment of the pitch of the blades of both propellers is borne by the rotor of the first aforementioned propeller, as well as the whole of the hydraulic connection means which are part of the limitation means for limiting the stroke of each piston of said hydraulic actuators.

Thus, the means for controlling the actuators and said limitation means for limiting the stroke of the pistons of these actuators only have to cross a single rotor/stator interface, i.e. the interface between the rotor of the first propeller and the stator.

The whole of said limitation means for limiting the stroke of the pistons of said actuators may then advantageously be controlled together.

In an analogous way to what was described above concerning the first propeller, said limitation means for limiting the stroke of each piston of each actuator intended for the adjustment of the pitch of the blades of said second propeller preferably include means for enabling and disabling said hydraulic connection means.

Further, said limitation means for limiting the stroke of each piston of each actuator intended for the adjustment of the pitch of the blades of said second propeller are advantageously configured in order to prevent a displacement of said blades of the propeller towards the small pitch angles beyond said predetermined limiting pitch angle.

Further, said hydraulic connection means, which are part of said limitation means for limiting the stroke of each piston of each actuator intended for the adjustment of the pitch of the blades of said second propeller, preferably comprise a hydraulic circuit including a first portion connected to a region of each cavity of each actuator which is part of said first chamber of the cavity when said blades of said second propeller have a pitch angle equal to said predetermined limiting pitch angle, a second portion connected to a region of each cavity of each actuator which, during a displacement of said blades in said predetermined direction, passes from said first chamber to said second chamber of the cavity as soon as the pitch angle of said blades becomes equal to said predetermined pitch angle, as well as a valve connecting said first and second portions of the hydraulic circuit for opening or closing on command said circuit.

These hydraulic connection means thus operate according to a principle analogous to the one of the connection means associated with the first propeller.

In a preferred embodiment of the invention, the system of counter-rotating propellers comprises a transfer bearing intended for the hydraulic supply of the whole of said actuators and of said hydraulic connection means from said stator of said propeller system, said transfer bearing including two pairs of hydraulic routes respectively dedicated to the control of said actuators of each propeller and a fifth hydraulic route dedicated to the joint control of the whole of the valves of said hydraulic connection means.

Thus, as the valves of the whole of the hydraulic connection means are jointly controlled, a single hydraulic route is required for the transmission of this control through the rotor/stator interface.

This configuration is particularly advantageous because it allows a hydraulic route to be saved relatively to a configuration in which the hydraulic connection means would be borne by the stator, and the transfer bearing of which would have to include two pairs of hydraulic routes respectively dedicated to the control of the actuators of each propeller as well as at least two additional hydraulic routes respectively corresponding to the second respective portions of the hydraulic circuits of said hydraulic connection means associated with both propellers.

In the preferred embodiment of the invention, the means for adjusting the setting of the blades of the propellers comprise a single hydraulic actuator for each propeller.

This actuator is then advantageously of the cylinder type. The system of propellers then preferably comprises mechanical means for converting the translational movement of the piston of each actuator into a displacement of the blades tending to modify their pitch.

In this case, the first aforementioned chamber of each actuator corresponds to the head chamber of the actuator while the second aforementioned chamber corresponds to the rod chamber of this actuator.

Moreover, in this case, both actuators advantageously comprise a common cylinder and two coaxial rods, one of which passes through the other.

Alternatively, said adjustment means for adjusting the setting of the blades of the propellers may comprise, for each propeller, a plurality of actuators respectively associated with the blades of the propeller and controlled together.

These actuators are then advantageously of the type comprising a rotary piston, i.e. comprising one or more firmly attached pistons rotatably mounted so as to drive into rotation an output rod of the actuator.

The invention further relates to a turbine engine, comprising a propeller of the type described above or a system of counter-rotating propellers of the type described above.

SHORT DESCRIPTION OF THE DRAWINGS

The invention will be better understood, and other details, advantages and features of the latter will become apparent upon reading the following description, made as a non-limiting example and with reference to the appended drawings in which the single FIGURE is a schematic view of certain components of a system of counter-rotating propellers in an aircraft turbine engine according to the invention.

DETAILED DISCUSSION OF A PREFERRED EMBODIMENT

The single FIGURE very schematically illustrates a system of counter-rotating propellers in an airplane turbine engine according to the invention and more particularly represents adjustment means for controlling the pitch of the blades 2, 4 of both propellers 6 and 8 of this counter-rotating propeller system.

These adjustment means notably comprise two double acting hydraulic cylinders or actuators 10 and 12 respectively intended for adjusting the pitch of the blades of both aforementioned propellers 6 and 8.

A first actuator 10 is intended for adjusting the pitch of the blades 2 of a first propeller 6 of this system of counter-rotating propellers via mechanical connection means 14 between this first actuator 10 and the blades 2 of the first propeller 6. This first actuator 10 as well as these mechanical connection means 14 are borne by the rotor 22 of the first propeller 6.

A second actuator 12 is intended for the adjustment of the pitch of the blades 4 of a second propeller 8 of this system of counter-rotating propellers via mechanical connection means 16 between this second actuator 12 and the blades 4 of the second propeller 8. This second actuator 12 is also borne by the rotor 22 of the first propeller 6, while the aforementioned mechanical connection means 16 are borne by the rotor 23 of the second propeller 8.

The aforementioned mechanical connection means 14 and 16 will not be described in more detail and are for example of a type known per se.

In the particular example illustrated in the FIGURE, both actuators 10 and 12 include a common barrel 24 divided in its middle by a partition wall 26 delimiting two cavities 28 and 30, and both actuators 10 and 12 include two respective coaxial rods 32 and 34. More specifically, the rod 32 of the first actuator 10 includes a longitudinal bore into which the rod 34 of the second actuator 12 extends. The rods 32 and 34 of the actuators each bear, in proximity to their end housed in the barrel 24, a piston 36, respectively 38, sealably sliding in the associated cavity 28, respectively 30, of the barrel 24.

Each aforementioned cavity 28, 30 of the common barrel 24 is itself divided by the corresponding piston 36, 38 into a head chamber 40 and a rod chamber 42. It should be noted that the head chamber 40 is a first chamber and that the rod chamber 42 is a second chamber in the sense of the terminology of the present invention.

For each actuator 10, 12, several remarkable positions of the piston 36, 38 of the actuator corresponding to particular adjustments of the pitch of the blades 2, 4 controlled by this actuator are indicated by arrows in the FIGURE. Thus, from left to right in each cavity 28, 30 of the barrel 24 common to both actuators 10 and 12, a first position 44 of the piston 36, 38 corresponding to a thrust inversion pitch, a second position 46 corresponding to a minimum admissible pitch angle in flight, as well as a third position 48 corresponding to a maximum pitch angle may be observed. The feathering of the blades of each propeller is obtained when the rod 32, 34 of the corresponding actuator is totally deployed, i.e. when the piston 36 or 38 of this actuator arrives as close as possible to the corresponding bottom 50, 52 of the rod chamber 42 of this actuator.

Each actuator 10, 12 is controlled by two pressurized fluid inlet channels 54 and 56, said fluid being for example oil taken from a lubrication circuit of the turbine engine of the aircraft.

A first 54 of these hydraulic channels opens out in proximity to the bottom 50, 52 of the rod chamber 42 of each actuator, and allows this chamber to be supplied with pressurized fluid in order to induce displacement of the piston 36, 38 in a direction inducing a reduction in the pitch angle of the blades 2, 4 controlled by this actuator, i.e. from right to left in the FIGURE. For this, the first channel 54 opens out axially between the aforementioned bottom 50, 52 of the rod chamber 42 and the position occupied by the corresponding piston 36, 38 during the feathering of the blades 2, 4 controlled by the actuator.

The second hydraulic channel 56 opens out in proximity to the bottom 58, 60 of the head chamber 40 of each actuator, and allows this chamber to be supplied with pressurized fluid in order to induce a displacement of the piston 36, 38 in a direction inducing an increase in the pitch angle of the blades 2, 4 controlled by this actuator, i.e. from left to right in the FIGURE. For this, the second channel 56 opens out axially between the aforementioned bottom 58, 60 of the rod chamber 40 and the first position 44 of the piston 36, 38 corresponding to the thrust inversion adjustment of the blades 2, 4 controlled by the actuator.

The rotor 22 of the aforementioned first propeller 6, which bears both actuators 10 and 12, also bears hydraulic connection means intended to have both chambers 40 and 42 of each of these actuators 10, 12 in fluidic communication with each other when the piston 36, 38 of these actuators occupies the second aforementioned position 46, in which said blades have a pitch angle equal to said minimum flight admissible angle, or when the piston 36, 38 exceeds this position in the direction of small pitch angles i.e. from right to left in the FIGURE. As this will appear more clearly in the following, by having both chambers 40 and 42 of each actuator 10, 12 in fluidic communication with each other, it is possible to prevent a displacement of the piston 36, 38 of the actuator towards small pitch angles beyond the aforementioned second position 46.

The aforementioned hydraulic connection means comprise, for each of the actuators 10 and 12, an associated hydraulic circuit 61 including a first portion 62 connected to the head chamber 40 of the cavity 28, 30 of the actuator substantially at the same axial level than the second hydraulic channel 56, a second portion 64 connected to the cavity 28, 30 at an area slightly away from the second aforementioned position 46 of the actuator toward large pitch angles, i.e. towards the right in the FIGURE, as well as a valve 66 connecting said first and second portions 62, 64 of the hydraulic circuit.

Both valves 66 respectively associated with said actuators 10 and 12 are controlled together in parallel through a hydraulic control channel 68 in order to open or to close on command the hydraulic circuit 61 respectively associated with both actuators.

In the example illustrated in the FIGURE, each valve 66 comprises a cylinder 70 as well as a drawer 72 bearing means 74 for obturating two orifices of the cylinder 70 which respectively communicate with the first and second portions 62, 64 of the corresponding hydraulic circuit 61. The drawer 72 of each valve 66 is sealably and slidably mounted in the cylinder 70 of the valve between a low pressure position, illustrated in the FIGURE, in which the obturation means 74 are moved away from the aforementioned orifices of the cylinder 70 so that the hydraulic circuit is closed and optionally allows depending on the position of the piston 36, 38 in the cavity of the corresponding actuator, that both chambers 40 and 42 of the corresponding actuator be put in communication, and a high pressure position in which the obturation means 74 cover the aforementioned orifices of the cylinder 70 so that the hydraulic circuit is open and therefore does not allow both chambers 40 and 42 of the corresponding actuator to communicate with each other.

The system of counter-rotating propellers further comprises a transfer bearing 76 positioned at the interface between a stator 78 of this system and the rotor 22 of said first propeller 6 so as to allow pressurized fluid to be supplied to the hydraulic channels 54 and 56 for controlling the actuators 10 and 12 as well as to be supplied to the hydraulic channel 68 for controlling the valves 66 of said hydraulic connection means.

In a way known per se, the transfer bearing comprises a plurality of annular grooves each connecting one of the hydraulic channels 54, 56, 68 of the rotor 22 to corresponding pressurized fluid supply means borne by the stator 78 (not visible in the FIGURE), and thus each forming a fluid transfer route.

As this appears in the FIGURE, the transfer bearing 76 comprises five fluid transfer routes, including two routes 80, 82 per controlled actuator 10, 12, said two routes being respectively connected to the hydraulic channels 54 and 56 for controlling the actuator, to which is added a route 84 connected to the hydraulic channel 68 for controlling the valves 66 of the hydraulic connection means.

The adjustment means for adjusting the pitch of the blades 2, 4 of both propellers 6 and 8 further comprise return means, not visible in the FIGURE, which for example assume the shape of a counterweight and which are intended to permanently apply to the blades 2, 4 a force tending to increase the pitch angle of these blades. Via mechanical connection means 14, 16, these return means therefore apply to the pistons 36 and 38 of the actuators 10 and 12 a return force 85 orientated towards the large pitch angles, i.e. from left to right in the FIGURE.

In operation, the valves 66 are in the state illustrated in the FIGURE when it is desired to prevent an adjustment of the pitch of the blades 2, 4 of the propellers 6 and 8 below the minimum admissible angle in flight. In this state, as this was explained above, the hydraulic circuits 61 of the aforementioned hydraulic connection means are maintained closed by the corresponding valves 66.

As long as the piston 36, 38 of an actuator 10, 12 occupies a shifted position towards the large pitch angles relatively to the second aforementioned position 46 corresponding to the minimum admissible pitch angle in flight, both portions 62 and 64 of the corresponding hydraulic circuit 61 open out into the head chamber of the actuator and therefore do not have the head 40 and rod 42 chambers of this actuator communicate with each other, so that an increase in the pressure in one of the hydraulic channels 54 and 56 causes a displacement of the piston 36, 38 of the actuator.

On the other hand, as soon as the piston 36, 38 of an actuator 10, 12 crosses the connection area of the second portion 64 of the hydraulic circuit associated with this actuator towards small pitch angles, i.e. from right to left in the FIGURE, the head 40 and rod 42 chambers of this actuator are put into fluidic communication by said hydraulic circuit 61 so that the fluid pressure is then balanced on either side of the piston 36, 38. Consequently, the pressure in the rod chamber 42 just balances the return force 85 without being able to exceed it so that the piston 36, then remains substantially in equilibrium at the second position 46.

When it is then desired to move the piston 36, 38 towards the large pitch angles, i.e. from left to right in the FIGURE, in order to increase the pitch angle of the corresponding blades 2, 4, it is sufficient to reduce the pressure fluid in the rod chamber 42 by means of the first hydraulic channel 54 so that the return force 85 becomes preponderant relatively to the fluid pressure in the rod chamber 42.

Thus, when the valves 66 are closed, the pistons 36, 38 of the actuators 10 and 12 cannot be controlled towards the small pitch angles beyond the second position 46 corresponding to the minimum admissible pitch angle in flight.

When the pitch angle of the blades 2, 4 of the propellers 6 and 8 has to be adjusted below the minimum admissible angle in flight, for example in order to obtain thrust inversion on the ground, the valves 66 are opened beforehand so that the head 40 and rod 42 chambers of each actuator 10 and 12 do not communicate with each other regardless of the position of the piston 36, 38 in the cavity 28, 30 of the actuator. It is then possible to control a displacement of the piston 36, 38 of each actuator 10, 12 beyond the second aforementioned position 46 towards the small pitch angles, and this optionally up to the first position 44, corresponding to the thrust inversion adjustment.

It should be noted accordingly that the whole of said hydraulic connection means form means for limiting the stroke of the piston 36, 38 of the actuators 10, 12, in the terminology of the present invention.

In the example described above, the whole of the blades 2, 4 of each propeller 6, 8 is driven by a single associated actuator 10, 12. The conversion of the telescopic movement of the actuator into a movement of rotation of the blades is ensured by mechanical connection means 14, 16.

Alternatively, each propeller 6, 8 may include a plurality of actuators respectively associated with the blades 2, 4 of the propeller. The plurality of actuators of each propeller is then controlled jointly in a way which is analogous to what is described above, by means of two hydraulic channels 54 and 56 as well as by a hydraulic circuit 61 connected in parallel to the respective cavities 28, 30 of the actuators of each blade.

In this case, the actuators are preferably of the rotary type. Each actuator may then include a plurality of cavities juxtaposed circumferentially around an output rod of the actuator, as well as a plurality of corresponding pistons firmly attached to said output rod and respectively housed in these cavities and controlled jointly, in a way known per se. For each propeller, with a hydraulic circuit 61 it is then possible in a way analogous with the one described above to put both chambers of each cavity of each actuator of the propeller in communication with each other.

The invention claimed is:

1. A propeller for an aircraft turbine engine, comprising:
   a first rotor;
   first blades borne by the first rotor and having an adjustable pitch angle;
   a first double acting hydraulic actuator borne by the first rotor and including a first cavity and a first piston slidably movable in the first cavity,
   wherein the first piston divides the first cavity into a first chamber and a second chamber, and the first piston is mechanically connected to the first blades so that the first piston changes the pitch angle of the first blades into a first pitch change direction when the first piston moves in a first displacement direction oriented from the second chamber towards the first chamber and vice versa,
   the propeller further comprising:
   a first couple of pressurized fluid inlet channels respectively connected to the first and second chambers of the first cavity whatever the position of the first piston, for moving the first piston,
   at least one first hydraulic circuit borne by the first rotor and including:
      a first portion which is connected to a first region of the first cavity which belongs to the first chamber whatever the pitch angle of the first blades,
      a second portion connected to a second region of the first cavity which is located so that, when the first piston moves in the first piston displacement direction from a position in which the second region is initially part of the first chamber of the first cavity, the second region becomes part of the second chamber of the first cavity as soon as the pitch angle of the first blades becomes equal to a first it pitch angle, and
      a first valve commutable between a first operational mode and a second operational mode,
   wherein, in the first operational mode, the first valve connects the first and second portions of the first hydraulic circuit to one another so as to form a closed circuit, and
   wherein, in the second operational mode, the first valve isolates the first and second portions of the first hydraulic circuit from one another.

2. The propeller according to claim 1, wherein the first pitch change direction is oriented towards the small pitch angles.

3. A system of counter-rotating propellers for an aircraft turbine engine, comprising:
   a first propeller according to claim 1, wherein the first rotor of the first propeller rotates in a first direction of rotation around a common longitudinal axis of the system relatively to a stator of this system;
   a second propeller comprising a second rotor which rotates in a second direction of rotation, opposite to the first direction of rotation, around the longitudinal axis, relatively to the stator of the system, and second blades borne by the second rotor; and
   a second double acting hydraulic actuator borne by the first rotor of the first propeller and comprising a second cavity and a second piston slidably movable in the second cavity,
   wherein the second piston divides the second cavity into a first chamber and a second chamber, and the second piston is mechanically connected to the second blades so that the second piston changes the pitch angle of the second blades into a second pitch change direction when the second piston moves in a second piston displacement direction oriented from the second chamber of the second cavity towards the first chamber of the second cavity and vice versa,
   the second propeller further comprising:
   a second couple of pressurized fluid inlet channels respectively connected to the first and second chambers of the second cavity whatever the position of the second piston, for moving the second piston,
   a second hydraulic circuit borne by the first rotor of the first propeller and including:
      a first portion which is connected to a first region of the second cavity which belongs to the first chamber thereof whatever the pitch angle of the second blades,
      a second portion connected to a second region of the second cavity which is located so that, when the second piston moves in the second piston displacement direction from a position in which the second region is initially part of the first chamber of the second cavity, the second region becomes part of the second chamber of the second cavity as soon as the pitch angle of the second blades becomes equal to a second limit pitch angle, and
      a second valve commutable between a first operational mode and a second operational mode,
   wherein, in the first operational mode, the second valve connects the first and second portions of the second hydraulic circuit to one another so as to form a closed circuit, and
   wherein, in the second operational mode, the second valve isolates the first and second portions of the second hydraulic circuit from one another.

4. The system of counter-rotating propellers according to claim 3, wherein the second pitch change direction is oriented towards the small pitch angles.

5. The system of counter-rotating propellers according to claim 3, further comprising a transfer bearing for supplying pressurized fluid from the stator of the system to the first and second double acting hydraulic actuators and to the first and second valves, the transfer bearing including two pairs of hydraulic routes respectively connected to the first and second couples of pressurized fluid inlet channels and a fifth hydraulic route jointly connected to the first and second valves.

6. A turbine engine comprising a propeller according to claim 1.

7. A turbine engine comprising a system of counter-rotating propellers according to claim 3.

8. A propeller for an aircraft turbine engine, comprising:
a first rotor;
first blades borne by the first rotor and having an adjustable pitch angle;
a first double acting hydraulic actuator borne by the first rotor and including a first cavity and a first piston slidably movable in the first cavity between two opposite extreme positions, namely a first position and a third position of the first piston,
wherein the first piston divides the first cavity into a first chamber having a bottom at a first extremity of the first cavity on the side of the first position of the first piston, and a second chamber having a bottom at a second extremity of the first cavity opposite to the first extremity thereof, on the side of the third position of the first piston,
wherein the first piston is mechanically connected to the first blades so that the first piston changes the pitch angle of the first blades into a first pitch change direction when the first piston moves in a first displacement direction oriented from the second chamber towards the first chamber and vice versa,
the propeller further comprising:
a first couple of pressurized fluid inlet channels, one of which being connected to the first chamber of the first cavity between the bottom of the first chamber and the first position of the first piston, and the other one of which being connected to the second chamber of the first cavity between the bottom of the second chamber and the third position of the first piston, for moving the first piston;
at least one first hydraulic circuit borne by the first rotor and including:
a first portion connected to the first cavity between the bottom of the first chamber thereof and the first position of the first piston so that the first portion remains connected to the first chamber whatever the position of the first piston,
a second portion connected to the first cavity between the first position and the third position of the first piston, and
a first valve commutable between a first operational mode and a second operational mode,
wherein, in the first operational mode, the first valve connects the first and second portions of the first hydraulic circuit to one another so as to form a closed circuit, and
wherein, in the second operational mode, the first valve isolates the first and second portions of the first hydraulic circuit from one another.

9. The propeller according to claim 8, wherein the first pitch change direction is oriented towards the small pitch angles.

10. A system of counter-rotating propellers for an aircraft turbine engine, comprising:
a first propeller according to claim 8, wherein the first rotor of the first propeller rotates in a first direction of rotation around a common longitudinal axis of the system relatively to a stator of this system,
a second propeller comprising a second rotor which rotates in a second direction of rotation, opposite to the first direction of rotation, around the longitudinal axis, relatively to the stator of the system, and second blades borne by the second rotor, and
a second double acting hydraulic actuator borne by the first rotor of the first propeller and comprising a second cavity and a second piston slidably movable in the second cavity between two opposite extreme positions, namely a first position and a third position of the second piston,
wherein the second piston divides the second cavity into a first chamber having a bottom at a first extremity of the second cavity on the side of the first position of the second piston, and a second chamber having a bottom at a second extremity of the second cavity opposite to the first extremity thereof, on the side of the third position of the second piston,
wherein the second piston is mechanically connected to the second blades so that the second piston changes the pitch angle of the second blades into a second pitch change direction when the second piston moves in a second piston displacement direction oriented from the second chamber of the second cavity towards the first chamber of the second cavity and vice versa,
the second propeller further comprising:
a second couple of pressurized fluid inlet channels, one of which being connected to the first chamber of the second cavity between the bottom of this first chamber and the first position of the second piston, and the other one of which being connected to the second chamber of the second cavity between the bottom of this second chamber and the third position of the second piston, for moving the second piston;
a second hydraulic circuit borne by the first rotor of the first propeller and including:
a first portion connected to the second cavity between the bottom of the first chamber thereof and the first position of the second piston so that the first portion remains connected to this first chamber whatever the position of the second piston,
a second portion connected to the second cavity between the first position and the third position of the second piston, and
a second valve commutable between a first operational mode and a second operational mode,
wherein, in the first operational mode, the second valve connects the first and second portions of the second hydraulic circuit to one another so as to form a closed circuit, and
wherein, in the second operational mode, the second valve isolates the first and second portions of the second hydraulic circuit from one another.

11. The system of counter-rotating propellers according to claim 10, wherein the second pitch change direction is oriented towards the small pitch angles.

12. The system of counter-rotating propellers according to claim 10, further comprising a transfer bearing for supplying pressurized fluid from the stator of the system to the first and second double acting hydraulic actuators and to the first and second valves, the transfer bearing including two pairs of hydraulic routes respectively connected to the first and second couples of pressurized fluid inlet channels and a fifth hydraulic route jointly connected to the first and second valves.

13. A turbine engine comprising a propeller according to claim 8.

14. A turbine engine comprising a system of counter-rotating propellers according to claim 10.

* * * * *

UNITED STATES PATENT AND TRADEMARK OFFICE
CERTIFICATE OF CORRECTION

PATENT NO. : 9,260,179 B2  
APPLICATION NO. : 13/235419  
DATED : February 16, 2016  
INVENTOR(S) : Pascal Marly It is certified that error appears in the above-identified patent and that said Letters Patent is hereby corrected as shown below:

Claims

Col. 9, line 67, Claim 1, change "first it pitch" to --first limit pitch--; and

Col. 12, line 54, Claim 10, change "so as to forma closed" to --so as to form a closed--.

Signed and Sealed this  
Nineteenth Day of July, 2016

Michelle K. Lee  
*Director of the United States Patent and Trademark Office*